(12) United States Patent
Faruque et al.

(10) Patent No.: US 9,849,855 B1
(45) Date of Patent: Dec. 26, 2017

(54) SEATBELT AIRBAG ASSEMBLY

(71) Applicant: Ford Global Technologies, LLC, Dearborn, MI (US)

(72) Inventors: Mohammed Omar Faruque, Ann Arbor, MI (US); Saeed David Barbat, Novi, MI (US); Dean M. Jaradi, Macomb, MI (US); S.M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/170,492

(22) Filed: Jun. 1, 2016

(51) Int. Cl.
B60R 21/18 (2006.01)

(52) U.S. Cl.
CPC .................................... B60R 21/18 (2013.01)

(58) Field of Classification Search
CPC ....................................................... B60R 21/18
See application file for complete search history.

(56) References Cited

U.S. PATENT DOCUMENTS

| 5,829,841 | A  * | 11/1998 | Pywell ..................... B60R 21/18 297/471 |
| 6,382,666 | B1 * | 5/2002 | Devonport .............. B60R 21/18 280/730.1 |
| 6,460,881 | B1 * | 10/2002 | Adomeit ................. B60R 21/18 280/730.1 |
| 7,641,233 | B2 | 1/2010 | Korechika |
| 8,740,244 | B2 | 6/2014 | Obadia |
| 8,882,141 | B2 | 11/2014 | Arnold et al. |
| 2002/0171233 | A1 | 11/2002 | Grace |
| 2005/0067818 | A1 | 3/2005 | Laue |
| 2014/0159350 | A1 * | 6/2014 | Schneider ............... B60R 21/18 280/728.2 |

FOREIGN PATENT DOCUMENTS

| DE | 102012014600 A1 | 1/2014 |
| JP | 2004330903 A | 11/2004 |
| JP | 20091223 A | 1/2009 |
| JP | 2012179939 A | 9/2012 |
| KR | 1020130007350 | 1/2013 |

OTHER PUBLICATIONS

UK Search Report dated Oct. 20, 2017 (rec'd. Oct. 27, 2017) re UK Appl. GB1708684.4.

* cited by examiner

*Primary Examiner* — Drew J Brown
(74) *Attorney, Agent, or Firm* — Frank A. MacKenzie; Bejin Bieneman PLC

(57) ABSTRACT

A seatbelt assembly includes a webbing guide defining a slot, webbing extending through the slot, an airbag, and a clamp. The airbag includes a fixed end fixed relative to the webbing guide and an inflatable end portion inflatable away from the fixed end along the webbing. The clamp is attached to the inflatable end portion and is movable from an unlocked position disengaged with the webbing to a locked position engaging the webbing.

19 Claims, 7 Drawing Sheets

# SEATBELT AIRBAG ASSEMBLY

BACKGROUND

Vehicles, such as automobiles, may include seatbelts for occupants. One arrangement of the seatbelt is a three-point harness: webbing of the seatbelt is anchored around the occupant at three points. Specifically, the webbing may be connected at a mounting point below and to one side of a hip of the occupant, may be connected above and to the same side of a shoulder of the occupant, and may fasten to the opposite side of the hip of the occupant. The webbing is divided into a shoulder band crossing from one shoulder of the occupant to the opposite side of the hip and a lap band crossing from one side of the hip to the other.

In the event of a collision, the webbing of the seatbelt may restrain the occupant against the momentum of the occupant. Although the seatbelt may reduce the likelihood of injury to the occupant caused by moving about a passenger cabin of the vehicle or exiting the vehicle during a collision, in some circumstances, the webbing may compress the chest of the occupant during restraint.

6B is a perspective view of an end of the airbag in the deployed position with a clamp of the seatbelt assembly in a locked position.

Figure 7A:
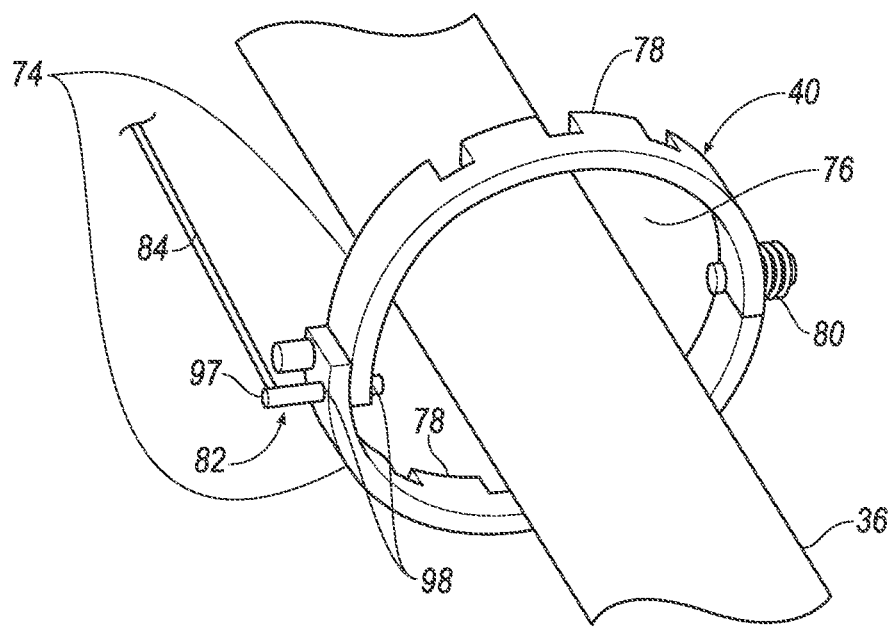

FIG. 7A is a perspective view of the clamp in the unlocked position.

Figure 7B:
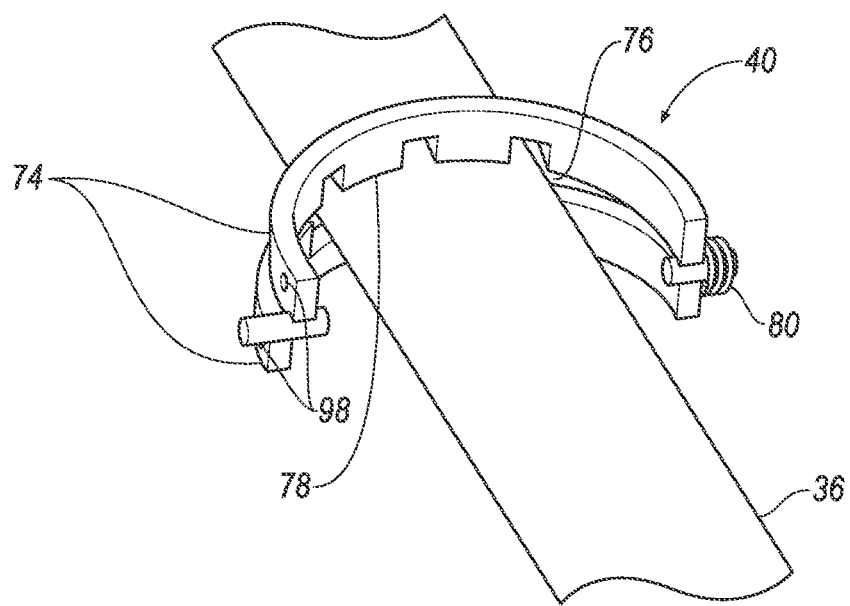

FIG. 7B is a perspective view of the clamp in the locked position.

Figure 8:
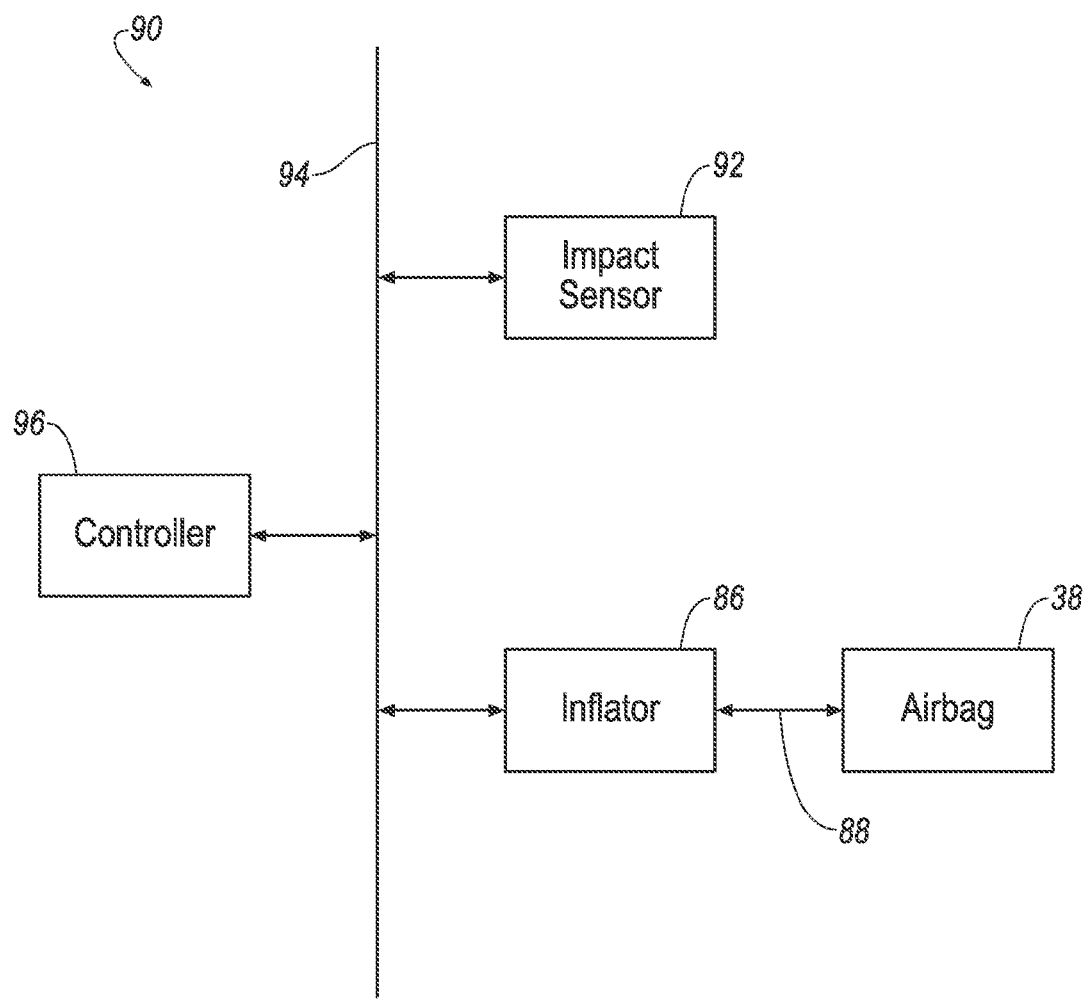

FIG. 8 is a block diagram of a control system for the seatbelt assembly.

DETAILED DESCRIPTION

With reference to the Figures, wherein like numerals indicate like parts throughout the several views, a seatbelt assembly 30 includes a webbing guide 32 defining a slot 34, webbing 36 extending through the slot 34, an airbag 38, and a clamp 40. The airbag 38 includes a fixed end 42 fixed relative to the webbing guide 32 and an inflatable end portion 44 inflatable away from the fixed end 42 along the webbing 36. The clamp 40 is attached to the inflatable end portion 44 and is movable from an unlocked position disengaged with the webbing 36 to a locked position engaging the webbing 36.

In the event of a collision of a vehicle 48, the airbag 38 distributes the stopping force of the webbing 36 across a greater area of a body of an occupant 46, which may reduce chest compression and may reduce the likelihood of injury to the occupant 46. During a vehicle collision, the webbing 36 of the seatbelt assembly 30 may apply force to the occupant 46 counteracting the momentum of the occupant 46 and thus bringing the occupant 46 to a stop with the vehicle 48. The airbag 38 may distribute and cushion this force as the force is applied to the occupant 46. When the inflatable end portion 44 of the airbag 38 inflates away from the fixed end 42, the clamp 40 moves to the locked position and engages the webbing 36 to retain the airbag 38 in position relative to the occupant 46.

Figure 1:
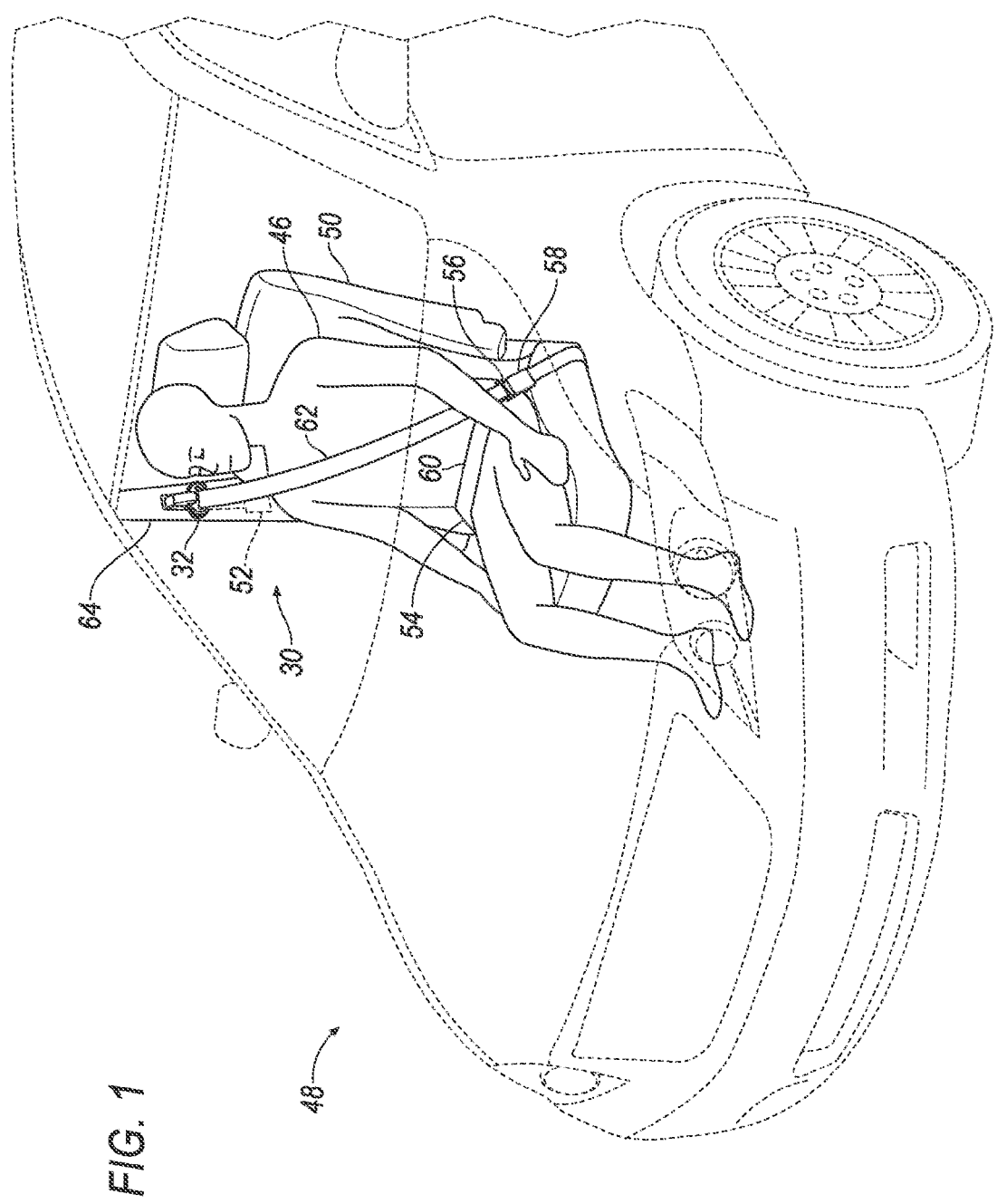
FIG. 1 is a perspective view of a vehicle including a seatbelt assembly.

As shown in FIG. 1, the vehicle 48 includes a seat 50 that may support the occupant 46. The seat 50 may be a front seat or a rear seat, and may be in any cross-vehicle position. The seat 50 shown in FIG. 1 is a bucket seat, but alternatively the seat 50 may be a bench seat or another type of seat.

The seatbelt assembly 30 may include a retractor 52. The webbing 36 is retractably payable from the retractor 52, i.e., may be extended from and retracted into the retractor 52. The seatbelt assembly 30 may include a buckle 58 fixed to the seat 50 and a clip 56 that releasably engages the buckle 58. The clip 56 may slidably engage the webbing 36 so that the clip 56 may be moved to a desired position along the webbing 36. When the clip 56 is engaged with the buckle 58 and the webbing 36 extends across the occupant 46, the seatbelt assembly 30 retains the occupant 46 on the seat 50, for example, during sudden decelerations of the vehicle 48. Specifically, the retractor 30 locks the webbing 36 to prevent payout of the webbing 36 during a sudden deceleration of the vehicle 48.

The seatbelt assembly 30 may include a lap-belt mounting 54 that attaches one end of the webbing 36 to the seat 50. The other end of the webbing 36 feeds into the retractor 52. The webbing 36 extends freely through the webbing guide 32. The clip 56 slides freely along the webbing 36 and, when engaged with the buckle 58, divides the webbing 36 into a lap band 60 and a shoulder band 62.

The seatbelt assembly 30 of FIG. 1 is a three-point harness, meaning that the webbing 36 is held at three points around the occupant 46 when fastened: the lap-belt mounting, the webbing guide 32, and the buckle 58. The seatbelt assembly 30 may, alternatively, include another arrangement of attachment points.

The retractor 52 may be attached to a body (not numbered) of the vehicle 48, e.g., to a B pillar 64 in the instance the seat 50 is a front seat, to a C pillar (not numbered) when the seat 50 is a rear seat, etc. The retractor 52 may alternatively be mounted to the seat 50. The retractor 52 may release the webbing 36 to allow an occupant 46 to position the webbing 36 around the occupant 46 and retract the webbing 36 to take up slack.

The webbing 36 may extend between the retractor 52 and the lap-belt mounting 54. Between the retractor 52 and the lap-belt mounting 54, the webbing 36 may extend through the webbing guide 32 and the clip 56. The webbing 36 may be formed of a fabric in the shape of a strap.

Figure 2:
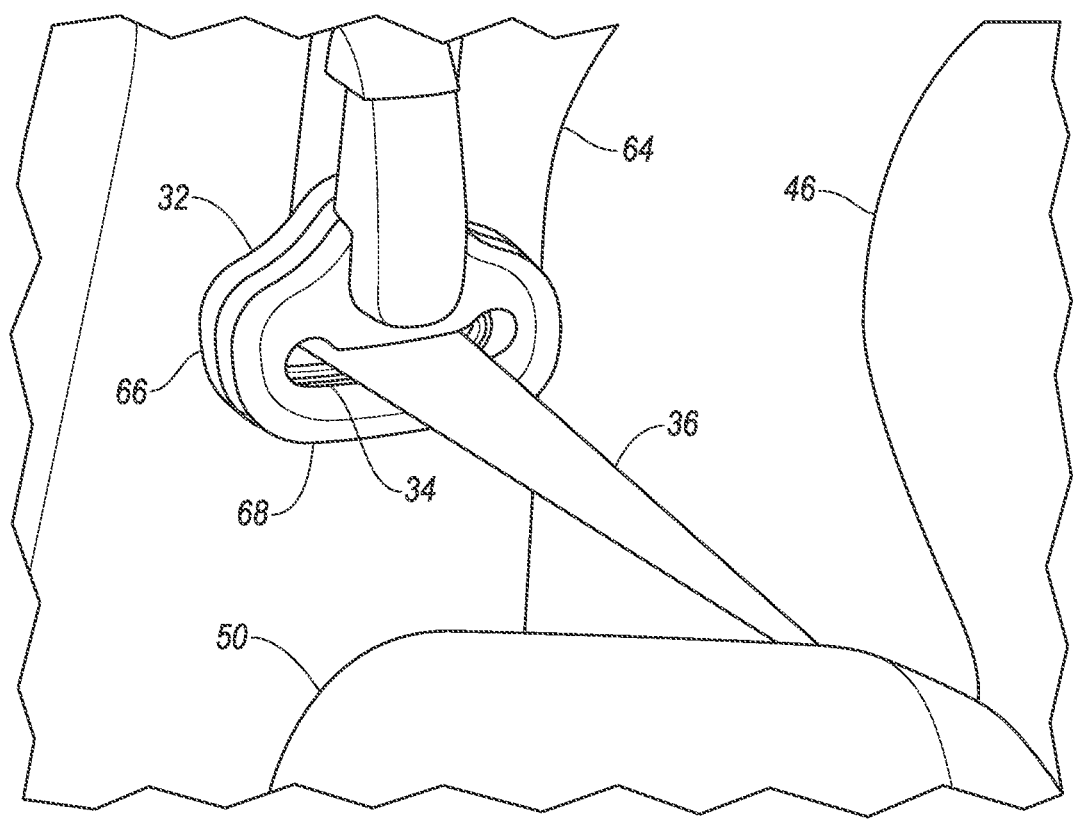
FIG. 2 is a perspective view of a portion of the seatbelt assembly including a webbing guide in the vehicle.
Figure 3:
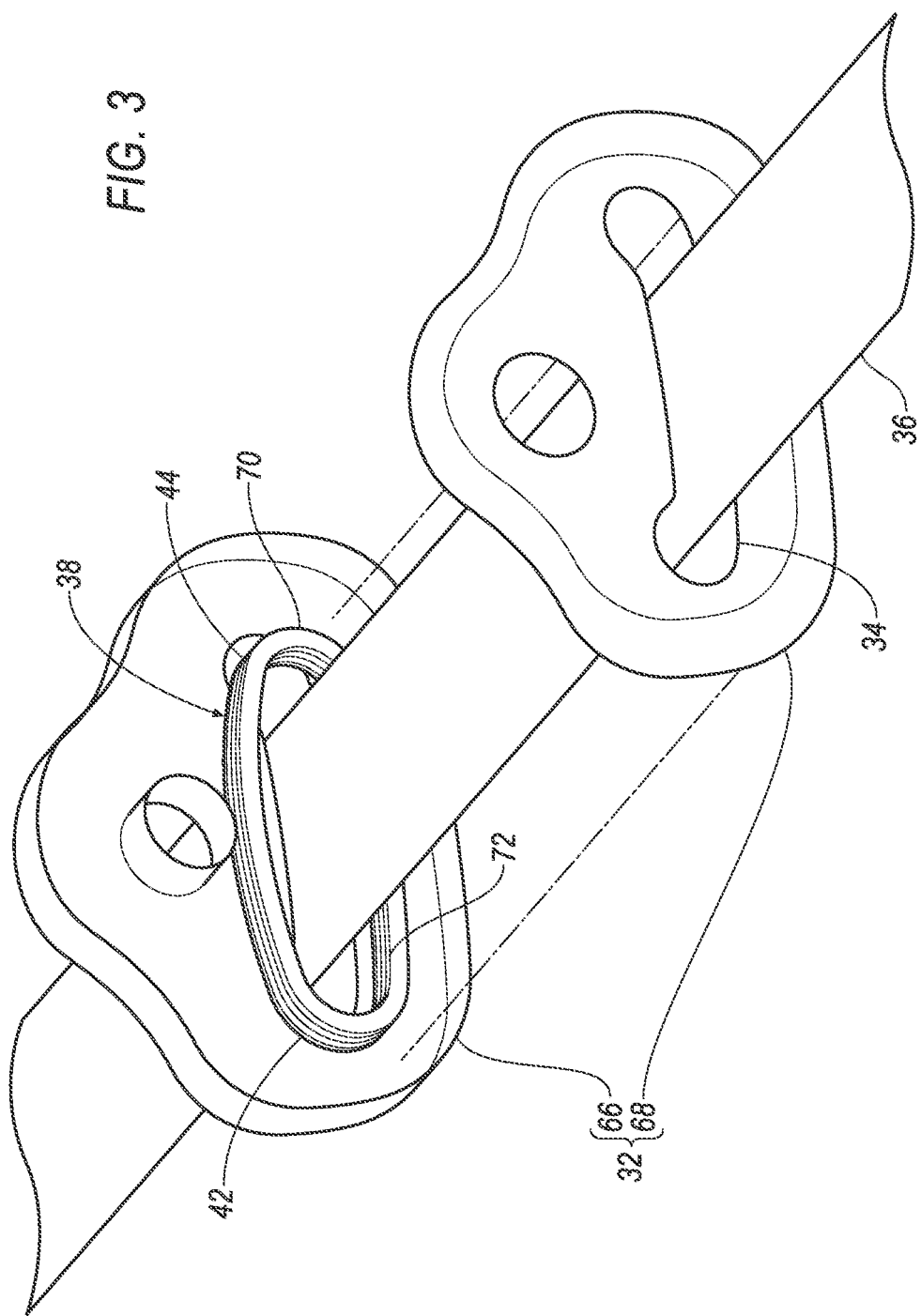
FIG. 3 is a partially exploded view of the webbing guide including an airbag in the undeployed position.

With reference to FIGS. 2 and 3, as set forth above, the webbing guide 32 defines the slot 34, and the webbing 36 extends through the slot 34 from the retractor 52 to the clip 56. The webbing guide 32 may position an end of the shoulder band 62 relative to the occupant 46 and may be located above and outside a shoulder of the occupant 46. The slot 34 may permit the webbing 36 to freely slide. The webbing guide 32 may include a webbing-guide housing 66 and a webbing-guide cover 68 attached to the webbing-guide housing 66. The slot 34 may extend through both the webbing-guide housing 66 and the webbing-guide cover 68. The webbing guide 32 may be formed of plastic, metal, components of each, or any other suitable material or materials.

The webbing guide 32 may be attached to a body (not numbered) of the vehicle 48, e.g., to the B pillar 64 in the instance the seat 50 is a front seat, to a C pillar (not numbered) when the seat 50 is a rear seat, etc. The webbing guide 32 may alternatively be mounted to the seat 50.

Figure 4:
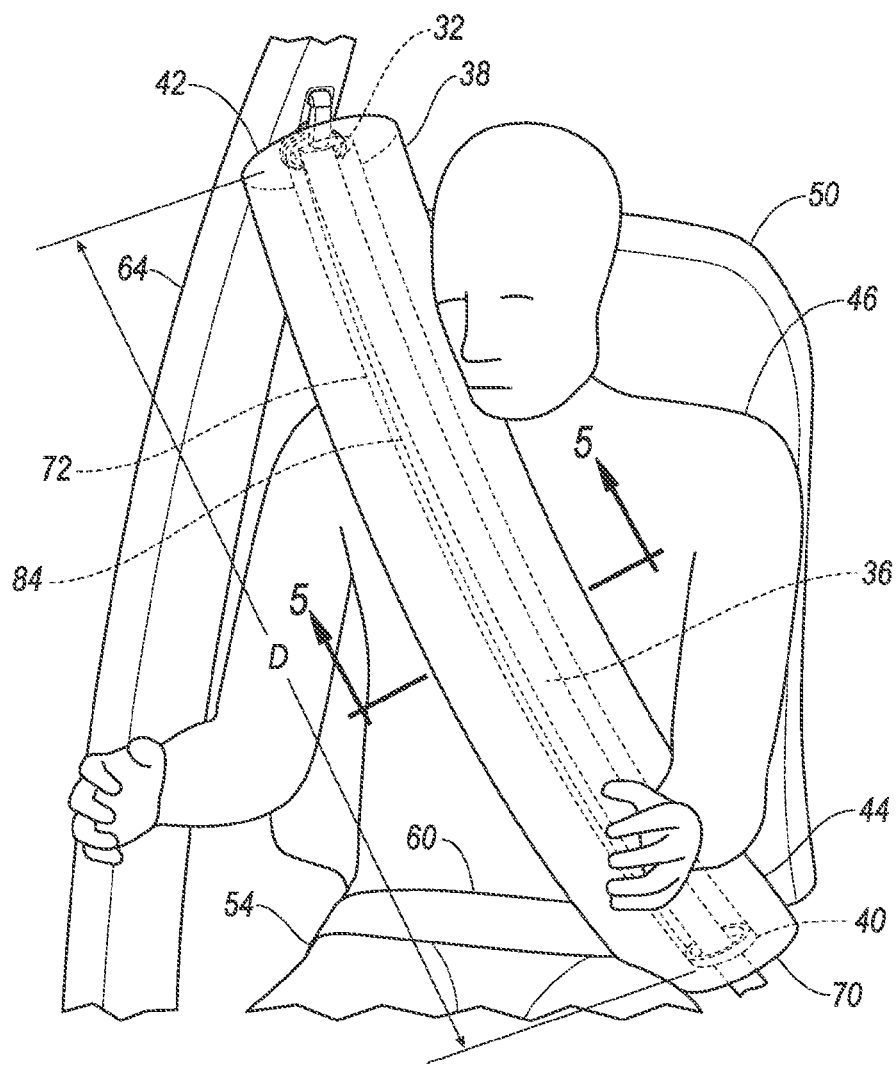
FIG. 4 is a perspective view of the airbag in a deployed position.

With reference to FIG. 4, as set forth above, the airbag 38 includes the fixed end 42 fixed relative to the webbing guide 32 and the inflatable end portion 44 inflatable away from the fixed end 42 along the webbing 36 toward the clip 56. The fixed end 42 may be fixed to the webbing guide 32. The inflatable end portion 44 of the airbag 38 includes a free end 70 spaced from the fixed end 42 when the airbag 38 is inflated.

The airbag 38, specifically the inflatable end portion 44, is inflatable from an uninflated position, as shown in FIGS. 1-3, to an inflated position, as shown in FIGS. 4-7B. In the uninflated position, the airbag 38 may be folded against the webbing guide 32, as shown in FIG. 3. Specifically, the airbag 38 may be folded inside the webbing guide 32 between the webbing-guide housing 66 and the webbing-guide cover 68. In the inflated position, the free end 70 may be spaced from the fixed end 42. If the airbag 38 is folded inside the webbing guide 32 in the uninflated position, inflating the airbag 38 may detach the webbing-guide cover 68 from the webbing-guide housing 66. In the inflated position, the airbag 38 may be generally tubular in shape, as shown in FIG. 4.

The airbag 38 may be formed of any suitable airbag material, for example, a woven polymer. For example, the airbag 38 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorganosiloxane.

Figure 5:
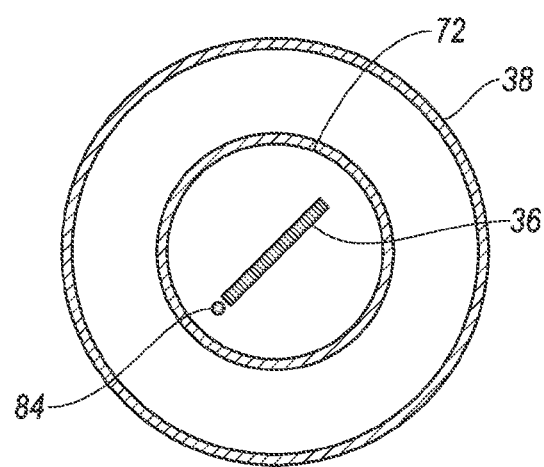
FIG. 5 is a cross-sectional view of the airbag in the deployed position along line 5 of FIG. 4.

As shown in FIG. 5, the airbag 38 may include a bore 72 extending from the fixed end 42 to the inflatable end portion 44. The bore 72 may receive the webbing 36; that is, the webbing 36 may extend through the bore 72, both when the airbag 38 is in the uninflated position and in the inflated position. The bore 72 at the fixed end 42 of the airbag 38 may align with the slot 34.

Figure 6A:
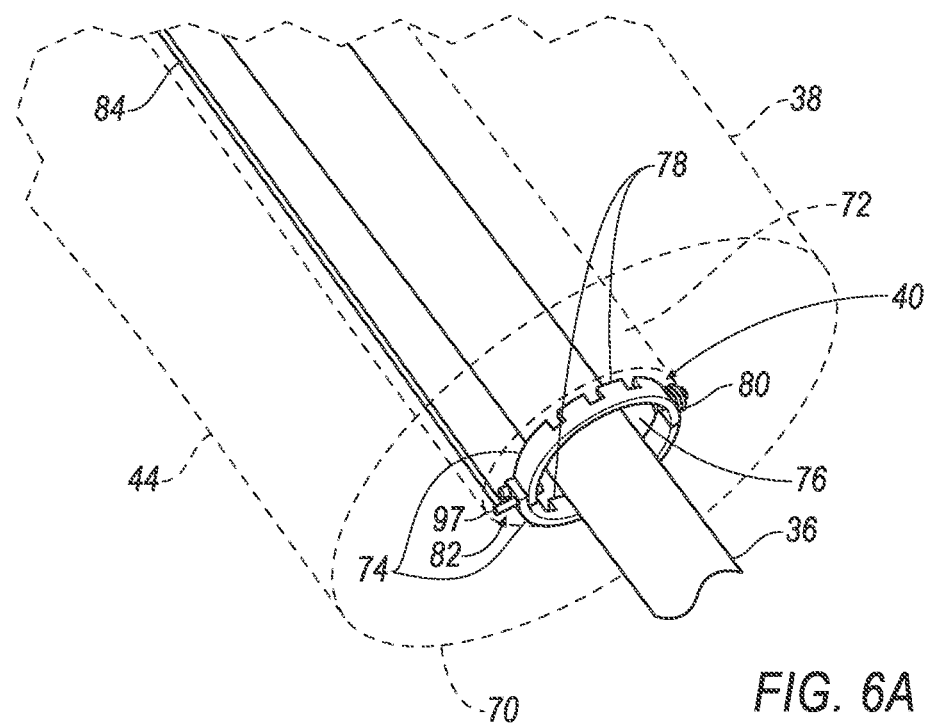
FIG. 6A is a perspective view of an end of the airbag in the deployed position with a clamp of the seatbelt assembly in an unlocked position.
Figure 6B:
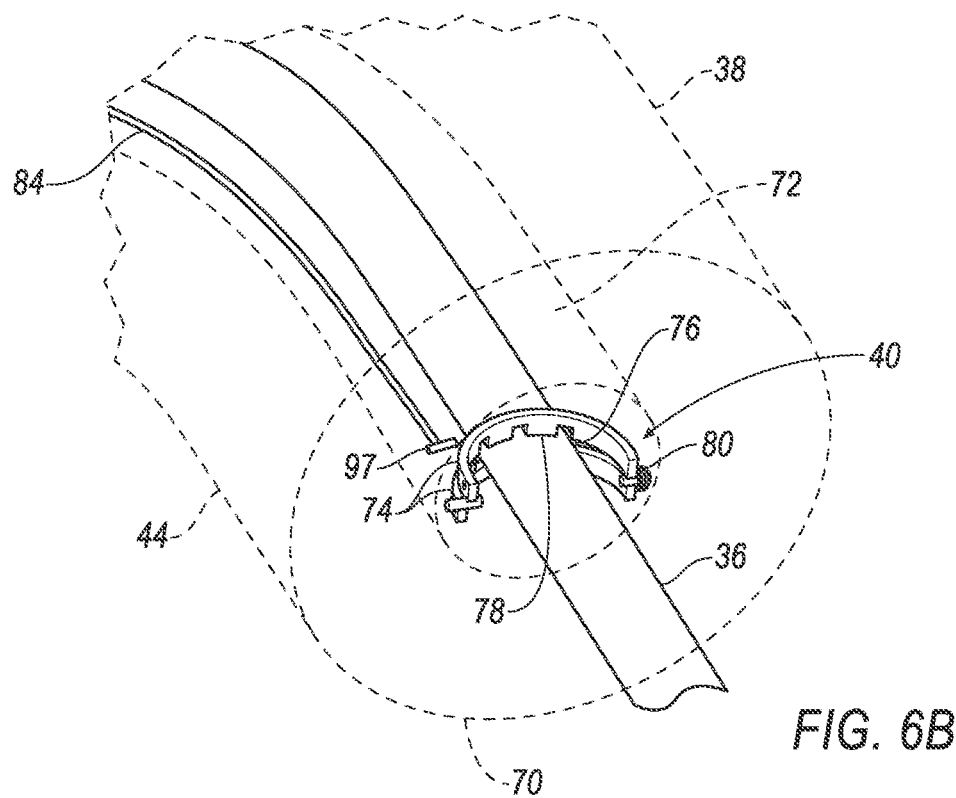

As shown in FIGS. 6A and 6B, the clamp 40 may be attached to the inflatable end portion 44 of the airbag 38 and specifically may be attached to the free end 70 of the airbag 38. The clamp 40 may be attached, for example, by hooking members (not shown) passing through fabric of the airbag 38, by stitching into the airbag 38, or by any other suitable means. The clamp 40 may be movable from an unlocked position disengaged with the webbing 36, as shown in FIG. 6A, to a locked position engaging the webbing 36, as shown in FIG. 6B.

As shown in FIGS. 7A and 7B, the clamp 40 may include two jaws 74 hinged relative to each other, e.g., about a hinge pin (not numbered). Each jaw 74 includes a gripping surface 78 for engaging the webbing 36. The gripping surfaces 78 may include teeth and/or may have a high coefficient of friction relative to the webbing guide 32. When the clamp 40 is in the unlocked position shown in FIG. 7A, the gripping surfaces 78 of the jaws 74 may be spaced from the webbing 36, and the webbing 36 may freely move through the clamp 40. When the clamp 40 is in the locked position shown in FIG. 7B, the gripping surfaces 78 of the jaws 74 may clamp onto the webbing 36 to prevent movement of the webbing 36 through the clamp 40.

The jaws 74 may include an opening 76 therebetween that receives the webbing 36. The opening 76 may align with the bore 72 at the inflatable end portion 44 of the airbag 38.

The clamp 40 may include a spring 80 biasing the jaws 74 toward the locked position. The spring 80 may be fastened to each jaw 74. The spring 80 may be a torsional spring, an extension spring, a compression spring, or any other suitable spring.

The clamp 40 may include a release 82 counteracting the spring 80. In other words, the release 82 may prevent the spring 80 from moving the clamp 40 from the unlocked position into the locked position. The release 82 may be, for example, a pin 97 fitted into release slots 98 in the jaws 74 that align when the clamp 40 is in the unlocked position.

A cord 84 may be connected to the webbing-guide housing 66 and to the release 82 and may extend from the webbing-guide housing 66 to the release 82. The cord 84 may be shorter than a distance D (identified in FIG. 4) from the fixed end 42 of the airbag 38 to the release 82 when the inflatable end portion 44 is in the inflated position. Thus, as the airbag 38 is inflated to the inflated position, the cord 84 may pull on the release 82, e.g., may pull the pin 97 from the slots 98, to release the clamp 40 to the locked position.

As an alternative to the cord 84, a sensor (not shown) may be coupled to the clamp 40. The sensor may send a signal to a controller 96 to move the clamp 40 from the unlocked position to the locked position. The sensor may be, for example, a proximity sensor. The sensor may detect a distance from the sensor to, for example, the clip 56. When the distance between the sensor and the clip 56 decreases below a threshold, the sensor may signal the release 82 to move the clamp 40 from the unlocked to the locked position. Alternatively, the sensor may be an inertial sensor. If, for example, a detected acceleration follows a particular pattern, such as increasing above a first positive threshold, falling below a second negative threshold, and rising to zero, the sensor may signal the release 82 to move the clamp 40 from the unlocked to the locked position.

With reference to FIG. 8, an inflator 86 may be in communication with the airbag 38. The inflator 86 may be disposed outside the webbing guide 32, for example, in the B pillar 64. Upon receiving a signal from, e.g., a controller 96, the inflator 86 may inflate the airbag 38 with an inflatable medium, such as a gas. The inflator 86 may be, for example, a pyrotechnic inflator that uses a chemical reaction to drive inflation medium to the airbag 38. The inflator 86 may be of any suitable type, for example, a cold-gas inflator.

The inflator 86 may be connected to the airbag 38 through a feed line 88. The feed line 88 may travel from the B pillar 64 to the webbing guide 32. The feed line 88 may be a flexible tube that maintains a fluid communication between the inflator 86 and the airbag 38.

As shown in FIG. 8, a control system 90 may be connected to the airbag 38. The control system 90 may include the inflator 86, the controller 96, and an impact sensor 92, in communication through a communications network 94.

The controller 96 may be in communication with the impact sensor 92 and the inflator 86. The controller 96 may be a microprocessor-based controller. The controller 96 may include a processor, memory, etc. The memory of the controller 96 may store instructions executable by the processor.

The impact sensor 92 may be in communication with the controller 96. The impact sensor 92 is adapted to detect an impact to the vehicle 48. The impact sensor 92 may be of any suitable type, for example, post-contact sensors such as accelerometers, pressure sensors, and contact switches; and pre-impact sensors such as radar, lidar, and vision-sensing systems. The vision systems may include one or more cameras, CCD image sensors, CMOS image sensors, etc. The impact sensor 92 may be located at numerous points in or on the vehicle 48.

The control system 90 may transmit signals through the communications network 94 such as a controller area network (CAN) bus, Ethernet, Local Interconnect Network (LIN), and/or by any other wired or wireless communications network.

As an example of the operation of the seatbelt assembly 30, in the event that the vehicle 48 is involved in a collision, first, the impact sensor 92 detects the collision. The impact sensor 92 signals the controller 96 through the communications network 94. The controller 96 determines that the airbag 38 should be deployed. The controller 96 instructs the inflator 86 to inflate through the communications network 94. The inflator 86 inflates the airbag 38 through the feed line 88. The airbag 38 inflates, pushing the webbing-guide cover 68 away from the webbing-guide housing 66. As the airbag 38 inflates, the airbag 38 pushes the shoulder band 62 of the webbing 36 away from a torso of the occupant 46, providing space between the shoulder band 62 and the occupant 46 for the airbag 38 to inflate. The airbag 38 follows the shoulder band 62 during inflation because the shoulder band 62 passes through the bore 72 of the airbag 38. As the airbag 38 inflates, the clamp 40 travels along the shoulder band 62. When the airbag 38 is nearly fully inflated, the cord 84 becomes taut. The cord 84 pulls the release 82, allowing the spring 80 to move the clamp 40 from the unlocked position to the locked position. The gripping surfaces 78 of the jaws 74 presses against the webbing 36 and may prevent the airbag 38 from retracting. The airbag 38 in the inflated position is positioned between the occupant 46 and the shoulder band 62. The airbag 38 distributes the force of the occupant 46 pushing against the shoulder band 62 across a wider area of the torso of the occupant 46, and the airbag 38 may thus reduce the likelihood of injury to the occupant 46.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seatbelt assembly comprising:
a webbing guide defining a slot;
webbing extending through the slot;
an airbag including a fixed end fixed relative to the webbing guide and an inflatable end portion inflatable away from the fixed end along the webbing; and
a clamp attached to the inflatable end portion and being movable from an unlocked position disengaged with the webbing to a locked position engaging the webbing;
wherein the clamp includes two jaws hinged relative to each other.

2. The seatbelt assembly of claim 1, wherein the airbag includes a bore extending from the fixed end to the inflatable end portion and receiving the webbing.

3. The seatbelt assembly of claim 1, wherein the fixed end of the airbag is fixed to the webbing guide.

4. The seatbelt assembly of claim 1, wherein the inflatable end portion of the airbag includes a free end spaced from the fixed end when the airbag is inflated, and wherein the clamp is attached to the free end.

5. The seatbelt assembly of claim 1, wherein the jaws include an opening therebetween, the opening receiving the webbing.

6. The seatbelt assembly of claim 1, wherein the clamp includes a spring biasing the jaws toward the locked position and a release counteracting the spring.

7. The seatbelt assembly of claim 6, further comprising a cord connected to the webbing guide and to the release.

8. The seatbelt assembly of claim 7, wherein the inflatable end portion is inflatable to an inflated position, and wherein the cord is shorter than a distance from the fixed end to the release when the inflatable end portion is in the inflated position.

9. The seatbelt assembly of claim 1, wherein the clamp includes a release, and further comprising a cord connected to the housing and to the release.

10. The seatbelt assembly of claim 9, wherein the inflatable end portion is inflatable to an inflated position, and wherein the cord is shorter than a distance from the fixed end to the release when the inflatable end portion is in the inflated position.

11. The seatbelt assembly of claim 1, further comprising a proximity sensor coupled to the clamp.

12. The seatbelt assembly of claim 1, further comprising an inertial sensor coupled to the clamp.

13. A seatbelt webbing guide assembly comprising:
a webbing guide defining a slot;
an airbag including a fixed end fixed relative to the webbing guide and an inflatable end portion inflatable away from the fixed end; and
a clamp attached to the inflatable end portion and being movable from an unlocked position to a locked position; wherein the clamp includes two jaws hinged relative to each other.

14. The seatbelt webbing guide assembly of claim 13, wherein the airbag includes a bore extending from the fixed end to the inflatable end portion.

15. The seatbelt webbing guide assembly of claim 14, wherein the bore at the fixed end aligns with the slot.

16. The seatbelt webbing guide assembly of claim 14, wherein the jaws include an opening therebetween, the opening aligning with the bore at the inflatable end portion.

17. The seatbelt webbing guide assembly of claim 13, wherein the clamp includes a spring biasing the jaws toward the locked position and a release counteracting the spring.

18. The seatbelt webbing guide assembly of claim 17, further comprising a cord connected to the housing and to the release.

19. The seatbelt webbing guide assembly of claim 18, wherein the inflatable end portion is inflatable to an inflated position, and wherein the cord is shorter than a distance from the fixed end to the release when the inflatable end portion is in the inflated position.

* * * * *